June 11, 1968     G. ALTMAN     3,388,027
GRAPHIC MATERIALS INCORPORATING MICROSPHERE DISTRIBUTIONS
FOR THE PRESENTATION OF VISUAL INFORMATION
Filed March 2, 1966

3,388,027
GRAPHIC MATERIALS INCORPORATING MICROSPHERE DISTRIBUTIONS FOR THE PRESENTATION OF VISUAL INFORMATION
Gerald Altman, 41 Westminster Road, Newton Center, Mass. 02159
Continuation-in-part of application Ser. No. 249,351, Jan. 4, 1963. This application Mar. 2, 1966, Ser. No. 531,298
8 Claims. (Cl. 161—4)

ABSTRACT OF THE DISCLOSURE

Visual products for the display of images are provided with strata of microspheres of selected optically operative characteristics. The distribution of the microspheres, by virtue of their small size, area concentration, refractive index and optically clear bond to their support, operates to control diffused and concentrated light for projection and observation.

Background and summary of the invention

The present invention relates to graphic materials that both are to be viewed by direct observation and are to be imaged by projection. More particularly the present invention relates to graphic sheets of a type that is characterized by a distribution of minute refracting optical spheres, which preserve pleasing diffusion of light transmitted from the sheet directly to the eye but which ensure efficient utilization of light projected from the sheet to a viewing screen or the like.

The present application is a continuation-in-part of U.S. patent application No. 249,351, filed Jan. 4, 1963, now Patent No. 3,269,839, issued Aug. 30, 1966, in the name of the applicant hereof for Optical Products, Processes and Devices. The disclosure of this patent, which is incorporated into the present disclosure by reference, illustrate uses for which materials of the present invention are intended.

A primary object of the present invention is to provide selected graphic materials of the foregoing type, by which directly viewed diffuse light may be effectively produced by any randomly selected source but by which projected concentrated light may be effectively utilized for image formation at a distance. In such applications as printing with ink, photography with developable particles, etc., it is advantageous to select the optical constants of the refracting spheres, particularly diameter and index of refraction, for optimum observation vs. projection relationships. In such applications, it is important that the refracting sphere distribution macroscopically provide a flux cross section that in effect is an optical continuum.

Other objects of the present invention are: to coat the surface of aluminum foil, via an optically clear cement, with particularly selected minute glass spheres that adjacently contact each other in order to provide a reflux-reflecting graphic sheet; to relate the optical constants of such minute glass spheres to the visual subject matter of strata in contact therewith and predeterminedly spaced therefrom; to print with colored minute glass spheres of the foregoing type; to enhance the projection capabilities of a translucency; and to provide a simple scribing technique that is adapted for direct diffuse observation and projection image production.

Other objects of the present invention will in part be obvious and will in part appear hereinafter.

The invention accordingly comprises the products and relationships among their components, which are exemplified in the following detailed disclosure, the scope of which will be indicated in the appended claims.

Brief description of drawing

For a fuller understanding of the nature and objects of the present invention, reference should be had to the following detailed description, taken in connection with the accompanying drawings, wherein.

Detailed description

Figure 1:
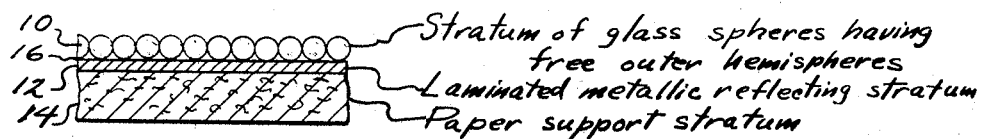
FIG. 1 is an exaggerated cross sectional view of an overhead projection product embodying the present invention.

Generally, the products illustrated herein utilize glass microspheres of optical clarity, of which 90% by weight range in diameter from 30 to 1 micron or below, and which have an index of refraction that ranges in various applications from 1.5 to 2.6. Especially suitable glass microspheres of the foregoing type are sold by Cataphote Corporation, Jackson, Miss., under the trade designation No. 4000 Extra Fine Uni-Spheres, a product composed of high-grade optical crown glass, soda-lime type, with silica content not less than 60%, and having an $N_D$ ranging from 1.5 to 1.9. Also suitable are glass microspheres of like small diameter having analagous compositions except for the addition of optimum high concentrations of lead or titanium, and having an $N_D$ ranging from 1.9 to 2.6. These microspheres are adhered to the illustrated substrates by an optically clear polymer, for example, gelatine, which has been applied from a suitable polar solvent such as water, linseed oil which has been applied from a suitable organic solvent such as turpentine or methyl methacrylate which has been applied from a suitable organic solvent such as toluene. The area concentration of the microspheres is maximized to achieve a covering power preferably of at least 90%, there being a range of larger microspheres which are virtually in contact with each other, i.e., no more than 10% of their average diameter apart, a range of smaller microspheres which cover the interstices defined by three or more adjacent larger microspheres, and in some cases additional layers of larger or smaller microspheres to cover interstices in other layers. The substrate to which the microspheres are applied is a continuous thin layer, preferably at most 0.001 inch, of a high (i.e. at least 90%) reflectance metal, such as aluminum or silver, which has been deposited on or laminated to a suitably thick (e.g. 0.0005 to 0.05) paper such as baryta or polymer such as cellulose acetate or cellulose nitrate. The overall selection of materials is such that a very large proportion of directive incident light is returned toward its source with controlled dispersion. The minimization of dispersion in the reflex reflected light cone, which is characteristic of traffic control reflex reflective materials well known in the prior art, is not a primary consideration in the cross of the present materials because the present materials are to be used in an optical system that intercepts the major proportion of the integrated flux cross section of a reflex reflected light cone that is broader than that needed by the prior materials. In order to achieve proper index of refraction relationships between the glass microsphere stratum and other strata of the product of the present invention, the glass microsphere stratum, in various forms, includes two or more substrata of glass microspheres of different $N_D$ or includes glass microspheres of different $N_D$ in predeterminedly interspersed relation. An important feature of the present materials is that the natural diffraction and aberration of the glass microspheres ensure sufficient scattering of randomly incident light to produce a white (or predeterminedly colored) appearance when viewed normally. The following examples of materials of the present invention are in reference to the figures of the drawing.

FIGURE 1 shows "open faced" layer of glass microspheres 10 bonded to a reflective metal coil 12 which is laminated to a paper support 14. Microspheres 10 range in diameter from 1 to 30 microns and have an index of refraction, $N_D = 1.9$. The outer hemispheres of microspheres 10 are free of adhesive and the inner hemispheres are bonded to foil 12 by a clear epoxy adhesive stratum having a depth of molecular dimension. Foil 12 in turn is bonded by a similar adhesive to paper support 14, which for example is composed of suitable kraft sheeting. The arangement is such that in excess of 90% of the area of foil 12 is covered by microspheres and the uncoated interstices serve as light conduits also by virtue of the reflectivity of the side surfaces of the microspheres that bound the interstices. The product of FIG. 1 is suitable for direct marking for use in an episcopic projector.

In a modification of the product of FIG. 1, a photographic transparency or other graphic representation is interposed at 16 between microsphere layer 10 and foil 12. In various forms, the photographic transparency is a developed silver halide, diazo, ferric, photopolymeric or photothermographic print. This representation is suitable for both direct observation and episcopic projection.

Figure 2:
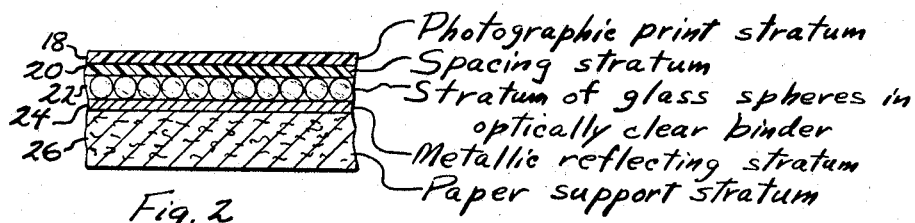
FIG. 2 is an exaggerated cross sectional view of a photographically developed product embodying the present invention.

FIG. 2 illustrates, in laminated sequence, a photographic print stratum 18, an optical spacing stratum 20, a glass microsphere stratum 22, a reflecting metal stratum 24 and a paper support stratum 26. Photographic print stratum 18 is a gelatino silver print. Spacing stratum is composed of gelatine and is sufficiently thick, e.g. .05 inch, to predeterminedly defocus glass microsphere stratum 22 when photographic print stratum 18 is in focus in an episcopic projector. The glass spheres are of titanium or lead glass having an $N_D$ ranging from 1.9 to 2.6. This high $N_D$ differs from the $N_D$ of outer gelatine strata sufficiently to ensure predetermined refraction.

Figure 3:
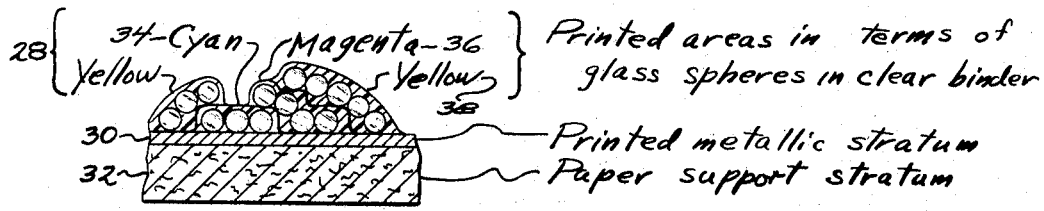
FIG. 3 is an exaggerated cross sectional view of a multicolor printed product embodying the present invention.

FIG. 3 illustrates, in laminated sequence, a three color halftone printed stratum 28, a reflecting aluminum stratum 30 and a paper support 32. This product is formed by an ordinary multicolor printing press having rollers which first apply metal layer 30 (either as foil as flake in a binder) to paper stratum 32 and then apply successive halftone coats of cyan ink 34, magenta ink 36 and yellow ink 38. As shown each of these inks includes crystal clear glass microspheres in a dyed matrix, the latter being composed of conventional viscous linseed varnish containing an appropriate chromophoric dye. In an alternative form of the product of FIG. 3, the glass spheres are colored and the varnish is clear. This form of the invention contemplates a two color process in which the only glass spheres are generally red and generally white appropriately representing color separation scenes that are generally blue and generally red.

Figure 4:
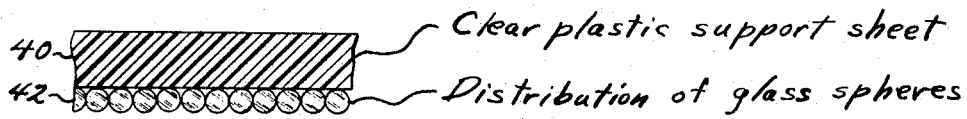
FIG. 4 is an exaggerated cross sectional view of a translucent projection product embodying the present invention.

FIG. 4 illustrates a clear plastic sheet 40 composed of gelatin or other flow index of refraction material, on which is disposed a distribution of microspheres 42 composed of glass having a relatively high index of refraction, preferably ranging from 1.8 to 2.6. Adhesion between the glass microspheres and the plastic sheet is effected by an aqueous mixture of 50%–50% gelatine and glycerine. This product is useful as a support for a photographic representation to be projected diascopically or as a rear projection screen.

Figure 5:
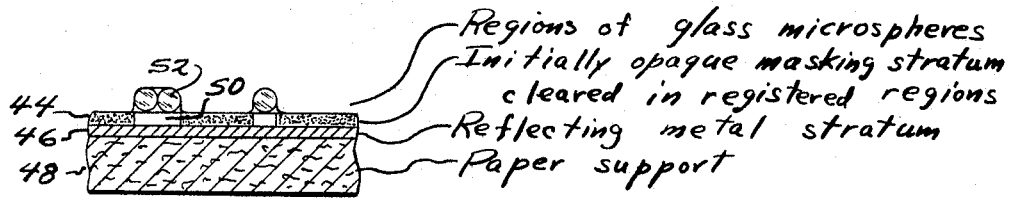
FIG. 5 is an exaggerated cross sectional view of a projection scribing product embodying the present invention.

FIG. 5 illustrates a normally opaque layer 44 that may be easily cleared when desired, a metal layer 46 and a paper support 48. Metal layer 46 and paper support 48 are analagous to the counterparts in FIGS. 1, 2 and 3. Normally opaque layer 44 is composed of a polar acting dye which clears in acid or alkali, for example, phenophthaline dispersed in a gelatine matrix. On the surface of opaque stratum 44 are shown in dried microsphere "ink" originally containing a dispersion of microspheres, of either high or low index of refraction, in an aqueous alkaline gelatine solution. When this ink is "written" onto opaque stratum 44, alkaline clearing takes place as at 50 and the glass microspheres are retained in position as at 52 to provide localized reflex reflecting regions having desired alphanumeric or symbolic configurations.

The present thus provides a variety of products that may be viewed comfortably in terms of diffuse light and may be projected effectively in terms of concentrated light. Since certain changes may be made in the above disclosure without departing from the scope of the invention herein involved, it is intended that all matter contained in the foregoing description or illustrated in the accompanying drawing be interpreted in an illustrative and not in a limiting sense.

What is claimed is:

1. A graphic product for direct observation in terms of diffuse light and for image projection in terms of concentrated light, said graphic product comprising, in laminated sequence, a paper-like backing stratum, a continuous metal reflecting stratum and a glass microsphere stratum, said microsphere stratum being composed of a multiplicity of microspheres which cover at least 90% of any selected macroscopic area of said metal reflecting stratum, at least 90% of said microspheres being less than 30 microns in diameter, said multiplicity including a range of larger microspheres defining interstices thereamong and a range of smaller microspheres filling said interstices, adjacent microspheres of said multiplicity being substantially in contact with each other, the bond between said multiplicity of microspheres and said metal reflecting stratum being optically clear in order not to obstruct access of light through said microsphere stratum to said metal reflecting stratum, substantially all of said multiplicity of microspheres being characterized by an outer optical surface remote from said metal reflecting stratum and an inner optical surface contiguous with said metal reflecting stratum, said outer optical surface being free to receive and transmit light incident on said microsphere stratum, said multiplicity of microspheres by virtue of their specified size, area concentration and optically clear bond to said metal reflecting stratum operating to diffuse randomly incident light for direct viewing and to concentrate directed light for episcopic projection.

2. The product of claim 1 wherein a developed photographic stratum is laminated to the outer face of said microsphere stratum.

3. The graphic product of claim 2 wherein said photographic stratum contains silver.

4. The graphic product of claim 1 wherein a visual presentation stratum is interposed between said microsphere stratum and said reflecting stratum.

5. The graphic product of claim 1 wherein said microspheres are associated in different regions and characterized by different colors.

6. The graphic product of claim 5, wherein a generally opaque masking stratum is interposed between said reflecting stratum and said microsphere stratum, said microsphere stratum having restricted and separated concentrations of microspheres, said masking stratum being cleared in the vicinity of concentrations.

7. A product comprising an optically clear support sheet, a glass microsphere stratum carried thereby, and a bonding material joining said microsphere stratum to said support sheet, said microsphere stratum being composed of a multiplicity of microspheres which cover at least 90% of any selected macroscopic area of said support sheet, said bonding material being optically clear, at least 90% of said microspheres being less than 30 microns in diameter, the index of refraction of said microspheres being substantially higher than the index of refraction of said support sheet, said multiplicity of microspheres by virtue of their small size, area concentration, index of refraction and optically clear bond to said support sheet operating to substantially diffuse randomly incident light for direct viewing but to substantially transmit concentrated light for projection.

8. The graphic product of claim 1 wherein the index of refraction of said microspheres is at least $N_D=1.9$.

References Cited

UNITED STATES PATENTS

| 2,354,049 | 7/1944 | Palmquist | 117—35 X |
| 2,403,752 | 7/1946 | Phillippi | 41—33 |
| 2,646,364 | 7/1953 | Porth | 117—3.5 |
| 2,963,378 | 12/1960 | Palmquist et al. | 106—193 |
| 2,997,403 | 8/1961 | Searight | 106—193 |

NORMAN G. TORCHIN, *Primary Examiner.*

R. H. SMITH, *Assistant Examiner.*